United States Patent [19]

Chattha et al.

[11] 4,181,784

[45] Jan. 1, 1980

[54] HIGH SOLIDS COATING COMPOSITION ADAPTED FOR USE AS AUTOMOTIVE TOPCOAT—#1

[75] Inventors: Mohinder S. Chattha, Livonia; Elaine C. S. Beckwith, Trenton; Henk van Oene, Detroit, all of Mich.

[73] Assignee: Ford Motor Company, Dearborn, Mich.

[21] Appl. No.: 945,030

[22] Filed: Sep. 22, 1978

Related U.S. Application Data

[63] Continuation-in-part of Ser. No. 864,958, Dec. 27, 1977, abandoned.

[51] Int. Cl.$^2$ ............................................. C08L 63/08
[52] U.S. Cl. ................................. 525/161; 260/42.22; 260/42.52; 525/163; 525/913
[58] Field of Search .......................................... 260/834

[56] References Cited

U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/2 EC |
| 2,732,367 | 1/1956 | Shokal | 260/834 |
| 2,849,418 | 8/1958 | Fang | 260/836 |
| 3,133,838 | 5/1964 | Higgins | 260/837 R |
| 3,198,850 | 8/1965 | Levantin | 260/837 R |
| 3,651,169 | 5/1972 | Davis | 260/834 |
| 3,960,979 | 6/1976 | Khanna | 260/834 |
| 4,027,066 | 5/1977 | Victorius | 260/834 |
| 4,055,607 | 10/1977 | Sullivan | 260/834 |

*Primary Examiner*—Paul Lieberman

*Attorney, Agent, or Firm*—Roger L. May; Keith L. Zerschling

[57] ABSTRACT

A fast curing, high solids coating composition that is adapted for use as an automotive topcoat and which upon curing forms a hard, glossy, durable coating exhibiting excellent resistance to solvents and water. The coating composition contains greater than about 60 percent by weight of nonvolatile solids and, exclusive of pigments, solvents and other nonreactive components, consists essentially of:

(A) a copolymer bearing pendant epoxy functionality, having a number average molecular weight ($\overline{M}_n$) of between about 1500 and about 10,000 and a glass transition temperature (Tg) of between about $-25°$ C. and about 70° C.;

(B) at least one organophosphate ester selected from certain mono- and diesters of phosphoric acid;

(C) an amine-aldehyde crosslinking agent; and (D) optionally a hydroxy functional additive.

The organophosphate ester is included in the composition in an amount sufficient to provide between about 0.67 and about 1.4 equivalents of acid functionality for each equivalent of pendant epoxy functionality of the copolymer of (A), and the amino resin crosslinking agent is included in the composition in an amount sufficient to provide at least about 0.67 equivalents of nitrogen crosslinking functionality for each equivalent of hydroxy functionality included in the composition either as a hydroxyl group of said optional hydroxy functional additive or as a result of esterification of the pendant epoxy functionality of the copolymer of (A) during curing of the composition.

14 Claims, No Drawings

HIGH SOLIDS COATING COMPOSITION ADAPTED FOR USE AS AUTOMOTIVE TOPCOAT—#1

This application is a continuation-in-part of Ser. No. 864,958 filed Dec. 27, 1977, and now abandoned.

BACKGROUND OF THE INVENTION

This invention is related to a fast curing, high solids, thermosetting coating composition. More particularly, the invention relates to a polymeric, high solids, fast curing coating composition adapted to provide an automotive topcoat which demonstrates hardness, high gloss, outstanding durability and excellent resistance to solvents and water. Still more particularly, this invention relates to a fast curing, high solids, thermosetting coating composition adapted to be used as an automotive topcoat wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic flake during application and curing of the coating. The flake reorientation results primarily because of the very low viscosity resins used in the paint compositions to accommodate high solids. The low thixotropy is not sufficient to immobilize the flakes which tend to redistribute themselves to show "reverse flop" and nonuniform distribution.

The coating compositions of this invention combine the above discussed desired properties and low application viscosity with rapid cure so as to overcome deficiencies of previously proposed high solids materials and thereby achieve a high solids coating composition particularly adapted for automotive topcoats and still more particularly adapted for automotive topcoats including metallic flake as a pigment.

SUMMARY OF THE INVENTION

The thermosetting coating composition of this invention contains greater than about 60 percent by weight of nonvolatile solids, preferably greater than about 70 percent by weight, and is capable of curing rapidly at a low temperature. The composition, exclusive of pigments, solvents and other nonreactive components, consists essentially of:
 (A) a copolymer bearing pendant epoxy functionality, having a number average molecular weight ($\overline{M}_n$) of between about 1500 and about 10,000, preferably between about 2,000 and about 6,000 and a glass transition temperature (Tg) of between about $-25°$ C. and about $70°$ C., preferably between about $-10°$ C. and about $50°$ C., the copolymer consisting essentially of between about 10 and about 30 weight percent of monoethylenically unsaturated monomers bearing glycidyl functionality and between about 90 and about 70 weight percent of other monoethylenically unsaturated monomers;
 (B) at least one organophosphate ester having the formula:

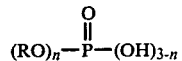

wherein n=1 to 2 and R is selected from alkyl, cycloalkyl, or aryl groups;
 (C) an amine-aldehyde crosslinking agent; and
 (D) up to about 45 weight percent based on the total weight of (A), (B), (C) and (D) of a hydroxy functional additive having a number average molecular weight ($\overline{M}_n$) of between about 150 and about 6,000, preferably between about 400 and about 2500.

The organophosphate ester is included in the composition in an amount sufficient to provide between about 0.67 and about 1.4 equivalents, preferably between about 0.8 and about 1 equivalents, of acid functionality for each equivalent of pendant epoxy functionality of the copolymer. The amino resin crosslinking agent is included in the composition in an amount sufficient to provide at least about 0.67, preferably between about 0.75 and about 3.75 equivalents, of nitrogen crosslinking functionality for each equivalent of hydroxy functionality included in the composition either as a hydroxyl group on the optional hydroxy functional additive or as a result of esterification of the pendant epoxy functionality of the copolymer during cure of the coating composition. In addition, the high solids coating composition of the invention may include additives such as catalysts, antioxidants, U.V. absorbers, flow control or wetting agents, antistatic agents, pigments, plasticizers, solvents, etc.

PRIOR ART

U.S. Pat. Nos. 3,960,979 and 4,018,848 to Khanna teach high solids coating compositions adapted for use as a can coating material. The compositions consists essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexibilizing polyol.

The compositions of Khanna have the advantage of quick reaction and low application viscosity, but lack durability, and, therefore, do not weather well. This is, in part, because of the presence of ether linkages in the aromatic epoxides. As such, the compositions of Khanna are not desirable for use as automotive topcoats. The Khanna patents describe the compositions as a low cure system. However, when considering the specific teachings of the patents one finds that the composition includes an excess of epoxide resin, apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give still further ether linkages. These ether linkages so obtained have a further deleterious effect on durability and make the materials particularly unsuitable for use as automotive topcoats. Also, the necessary high bake temperatures to achieve the utilization of this excess epoxy makes the composition undesirable from an energy point of view. Still further, because the epoxy/catalyst reaction occurs in early stages of the cure, thus "killing off" the catalyst, the melamine-hydroxy curing reaction must proceed substantially without benefit of catalysis. The curing reaction thus proceeds slowly and requires the high temperatures of the Khanna examples.

DETAILED DESCRIPTION OF THE INVENTION

The high solids coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., from about 75° C. to about 150° C., preferably from about 110° C. to about 130° C. The desirable characteristics of the coating compositions of this invention result from the carefully controlled admixture of the particular components to achieve substantially complete utilization of reactant functionality in a fast and efficient manner.

Each of the components of the high solids coating compositions, the amounts of each of the components required to achieve the desired results of the invention and a method for applying the composition are described hereinafter in greater detail.

Epoxy Functional Copolymer

A principal material in the high solids coating compositions of this invention is an epoxy functional copolymer bearing pendant epoxy functionality, and which may be prepared by conventional free radical induced polymerization of suitable unsaturated monomers. The term "copolymer" as used herein means a copolymer of two or more different monomers.

The copolymers used in the high solids coating compositions of this invention have a number average molecular weight ($\overline{M}_n$) of between about 1500 and about 10,000, preferably between about 2,000 and about 6,000, and a glass transition temperature (Tg) of between about −25° C. and about 70° C., preferably between about −10° C. and about 50° C. The monomers used to prepare the copolymer include between about 10 and about 30 weight percent of one or more monoethylenically unsaturated monomers bearing glycidyl functionality. These monoethylenically unsaturated monomers may be glycidyl ethers or glycidyl esters. Preferably, however, the epoxy functional monomers are glycidyl esters of monoethylenically unsaturated carboxylic acids, e.g., glycidyl acrylate or glycidyl methacrylate. These monomers provide the copolymer with its pendant epoxy functionality.

The remainder of the monomers forming the epoxy functional copolymer, i.e., between about 90 and about 70 weight percent of the monomers of the copolymer, are other monoethylenically unsaturated monomers. These monethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha-methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only up to about 30 weight percent of the monomers in the copolymer.

In preparing the epoxy functional copolymer, the epoxy functional monomers and the remaining monoethylenically unsaturated monomers are mixed and reacted by conventional free radical initiated polymerization in such proportions as to obtain the copolymer desired. A large number of free radical initiators are known to the art and are suitable for the purpose. These include: benzoyl peroxide; lauryl peroxide; t-butylhydroxy peroxide; acetylcyclohexane; sulfonyl peroxide; diisobutyryl peroxide; di-(2-ethylhexyl) peroxydicarbonate; diisopropylperoxydicarbonate; t-butyl peroxypivalate; decanoyl peroxide, azobis(2-methylpropionitrile), etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a nonsolvent for the copolymer such as hexane, octane, or water under suitable agitation conditions.

The pendant epoxy functional copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions.

Organophosphate Ester

A second essential component of the high solids coatings of this invention is an organophosphate mono- or diester or a mixture of such mono- and diesters. Such organophosphate esters are preferably formed by esterification of phosphoric acid or its anhydrides or by controlled hydrolysis of alkyl, cycloalkyl or aryl halophosphates. Organophosphate esters useful in the compositions of the invention are those having the formula:

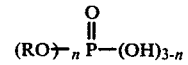

wherein n = 1 to 2 and R is selected from alkyl, cycloalkyl or aryl groups. Preferably, the mono- or diesters are alkyl esters and the hydrocarbon substituent may be in such cases any alkyl group including, but not limited to methyl, ethyl, butyl, amyl, 2-ethylhexyl, lauryl, stearyl, etc. The most preferred alkyl groups contain 2 to 6 carbon atoms and are primary straight chain radicals.

The organophosphate ester component of the high solids coating composition of the invention is a reactive catalyst which allows the composition to cure rapidly at a low temperature. The acid functionality of the mono- or diester or mixture of such esters reacts with the pendant epoxy functionality of the epoxy functional copolymer to form an ester and a hydroxyl group. It is this hydroxyl functionality which crosslinks with the amino resin crosslinking agent. It is critical to achieving the desired results of the high solids coating compositions of this invention, i.e., in making them suitable for use as automotive topcoats, that the amount or organophosphate ester be sufficient to convert substantially all of the epoxy functionality on the copolymer to the desired hydroxy functionality by esterification reaction. Therefore, the organophosphate ester is included in the composition in an amount sufficient to provide between about 0.67 and about 1.4 equivalents, preferably between about 0.8 and about 1 equivalents, of acid functionality for each equivalent of pendant epoxy functionality on the copolymer. As will be noted from the equivalent amount stated above, the amount or organophosphate ester acid functionality need not be in stoichiometric amounts to the epoxy functionality. This is because during curing of the high solids coating composition, residual water present in the composition hydrolyzes some of the esterified product back to acid and this hydrolyzed product, in turn, reacts with additional epoxy functionality.

Amino Crosslinking Agent

A third essential component of the high solids paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100 percent nonvolatile content as measured by the foil method at 45° C. for 45 minutes. For the purposes of the invention it should be recognized that it is important not to introduce extraneous diluents that would lower the final solids content of the coating.

Particularly preferred crosslinking agents are the amino crosslinking agents sold by American Cyanamid under the trademark "Cymel." In particular, Cymel 301, Cymel 303 and Cymel 1156, which are alkylated melamine-formaldehyde resins, are useful in the compositions of this invention.

The amine-aldehyde materials function as a crosslinking agent in the composition of the invention by reacting with hydroxy functionality created by esterification of the pendant epoxy functionality on the epoxy functional copolymer and by reaction with hydroxy functionality on the hydroxy functional additive if such material is included in the composition.

In order to achieve the outstanding properties which make these coating compositions particularly useful as automotive topcoat materials, it is essential that the amount of amino crosslinking agent be sufficient to substantially completely crosslink the hydroxy functionality in the coating composition. Therefore, the amino crosslinking agent should be included in the composition in an amount sufficient to provide at least about 0.67 equivalents, preferably between about 0.75 and about 3.75 equivalents, of nitrogen crosslinking functionality for each equivalent of hydroxy functionality included in the composition either as a hydroxyl group on the optional hydroxy functional additive or as a result of esterification of the pendant epoxy functionality of the epoxy functional copolymer during cure of the coating composition.

Optional Hydroxy Functional Additive

Additional hydroxy functionality other than that achieved by esterification of pendant epoxy functionality of the epoxy functional copolymer may be achieved by adding a hydroxy functional additive in amounts up to about 30 weight percent based on the total of the three above discussed components and the hydroxy functional additive itself. Such a material serves to provide additional hydroxy functional additives so as to provide a more intimate crosslinked structure in the final cured product. The hydroxy functional additives useful in the composition are preferably selected from various polyols having a number average molecular weight ($\overline{M}_n$) of between about 150 and about 6,000, preferably between about 400 and about 2500. As used herein the term polyol means a compound having two or more hydroxyl groups.

The polyols useful in the invention preferably are selected from the group consisting of: (i) hydroxy functional polyesters; (ii) hydroxy functional polyethers; (iii) hydroxy functional oligoesters, (iv) monomeric polyols; (v) hydroxy functional copolymers produced by free radical polymerization of monoethylenically unsaturated monomers, one of which bears hydroxy functionality and which is included in the copolymer in an amount ranging from about 2.5 to about 30 weight percent, and (vi) mixtures of (i)–(v).

The hydroxy functional polyesters useful in the invention are preferably fully saturated products prepared from aliphatic dibasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, noepentyl glycol 1,4-cyclohexane dimethanol, 1,6-hexamethylene glycol and 2-ethyl-2-methyl-1,3 propane diol. The molecular weight of these materials ranges from about 200 to about 2500 and the hydroxyl number ranges from about 30 to about 230. The hydroxyl number is defined as the number of milligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols and mixtures thereof.

Among useful polyether diols are polytertramethylene ether glycol, polyethylene glycol, polypropylene glycol and the like.

Th hydroxy functional oligoesters useful as hydroxy functional additives in the compositions of the invention are oligoesters preferably having a molecular weight of between about 150 and about 3000. Such oligoesters may be selected from the group consisting of: (1) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

The oligoester prepared by reacting a dicarboxylic acid with an alkylene oxide is a low molecular weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred dicarboxylic acids are $C_6$–$C_{12}$ aliphatic acids such as adipic acid, azelaic acids, sebacic acid or dodecane dicarboxylic acid. Mixtures of these acids or mixtures of the aliphatic dicarboxylic acids with aromatic dicarboxylic acids also yield suitable hydroxy functional oligoesters.

The preparation of oligoesters from carboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be formed from monoethylenically unsaturated monomers, with between about 2.5 and about 30 weight percent bearing hydroxyl functionality.

The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxy-propyl acrylate; 2,3 dihydroxypropyl acrylate; 2-hydroxy-butyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3 dihydroxypropyl methacrylate, 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxy bearing monomers, including those listed above could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_3$ dihydric alcohols and acrylic or methacrylic acids.

The remainder of the monomers forming the hydroxy functional copolymer, i.e., between about 90 and about 70 weight percent, are other monoethylenically unsaturated monomers. These monoethylenically unsaturated monomers, as was the case with respect to the epoxy functional copolymer discussed above, are preferably alpha-beta olefinically unsaturated monomers. As was also the case with respect to the epoxy functional copolymer, the preferred alpha-beta olefinically unsaturated monomers are acrylates and preferably are employed in excess of 50 weight percent of the total copolymer. Preferred acrylate monomers are esters of $C_1$–$C_{12}$ monohydric alcohols and acrylic or methacrylic acids. Monovinyl hydrocarbons and other modifying monomers may also be employed in the same proportion as they are employed in the epoxy functional copolymer discussed above.

Other Materials

In addition to the above discussed components, other materials may be included in the high solids coating compositions of the invention. These include materials such as catalysts, antioxidants, U.V. absorbers, solvents, surface modifiers and wetting agents as well as pigments. The solvent used in the coating compositions of the invention are those which are commonly used. Typical solvents useful in the coating compositions facilitate spray application at high solids content and include toluene, xylene, methyethyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the epoxy functional copolymer of the coating composition is prepared, may be employed as the solvent for the coating composition thus eliminating the need for drying the epoxy functional copolymer after preparation if such is desired. As mentioned above, the nonvolatile solids content of the high solids coating composition is at least 60 percent and preferably 70 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1–10 percent by weight of a copolymerized monoethylenically unsaturated carboxylic acids such as methacrylic acid, acrylic acid or itaconic acid, cellulose acetate butyrate, silicon oils or mixtures thereof. Of course, the choice of surface modifiers or wetting agent is dependent upon the type of surface to be coated and selection of the same is clearly within the skill of the artisan.

The high solids coating composition of the invention also may include pigments. As noted above, the high solids compositions of this invention are particularly useful when the coating composition includes metallic flake as a pigment. The rapid set and curing of the composition eliminates problems associated with redistribution of the metallic flake. The amount of pigment in the high solids coating composition may vary, but preferably is between about 3 and about 45 weight percent based on the total weight of the paint composition. If the pigment is metallic flake, the amount ranges from about 1 to about 7 weight percent.

Application Techniques

The high solids coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

High solids paints have in the past caused some difficulty in spray coating techniques because of the high viscosity of the materials and resultant problems in clogging of spray guns. However, because the compositions of this invention demonstrate relatively low viscosity considering the high solids content they can be applied by spray coating techniques.

The invention will be further understood by referring to the following detailed examples. It should be understood that the specific examples are presented by way of illustration and not by way of limitation. Unless otherwise specified, all references to "parts" is intended to means parts by weight.

EXAMPLE 1

The following mixture of monomers was used for a polymer synthesis:

|  | Wt. (gram) | Wt. % |
|---|---|---|
| Butylmethacrylate | 127.5 | 17 |
| Ethylhexyl acrylate | 180 | 24 |
| Glycidyl methacrylate | 195 | 26 |
| Methyl methacrylate | 210 | 28 |
| Styrene | 37.5 | 5 |

37 grams t-butyl perbenzoate is added to the above monomer mixture the resulting solution added over a period of one hour and 10 minutes to 500 grams of refluxing methyl amyl ketone refluxing methyl amyl ketone under nitrogen. Heating and stirring is continued for half an hour after the addition is complete and then two grams of t-butylperbenzoate are added portionwise. The reaction mixture is refluxed for two more hours and then allowed to cool to room temperature. The calculated Tg of the polymer obtained is 9° C. and the solution viscosity is 41 Sec. #4 Ford cup.

Eighty-three and one third (83⅓) parts of the above polymer solution and 30 parts of Cymel 301 are dissolved in 25 parts of butyl acetate and 11 parts of butyl acid phosphate (mixture of monobutyl and dibutyl phosphates, equivalent wt. 120) are added to the solution. The resulting formulation is applied to steel test panels by spraying. The panels are baked at 130° C. for 20 minutes to obtain a glossy (82/20°) coating with excellent hardness, adhesion and solvent (xylene and methylamyl ketone) resistance. The coating does not show any loss of gloss or adhesion after 14 days exposure in a Cleveland Humidity Chamber.

EXAMPLE 2

Four parts of aluminum flakes (65% in naphtha) are mixed well with 80 parts of the polymer solution prepared in accordance with Example 1. Thirty (30) parts of Cymel 301 and 25 parts of butyl acetate are added to the above mixture and the resulting material is filtered through a course filtering cloth. Eleven (11) parts of butyl acid phosphate (Eq. wt. 120) are added to the filtrate and the resulting formulation is immediately applied to primed steel test panels by spraying in a three coat application. The intermediate flash time is one minute and the final flash is five minutes. The panels are baked at 110° C. for 20 minutes to obtain coatings with excellent adhesion and solvent (xylene and methyl ethyl ketone) resistance. There is no apparent aluminum reorientation and the gloss is 62/20° C.

EXAMPLE 3

An epoxy functional copolymer is prepared from the following monomers:

|  | Wt. (grams) | Wt. % |
|---|---|---|
| Butyl methacrylate | 120 | 16 |
| Ethyl hexyl acrylate | 142.5 | 19 |
| Glycidyl methacrylate | 195 | 26 |
| Methyl methacrylate | 255 | 34 |
| Styrene | 37.5 | 5 |

The polymerization is carried out as outlined in Example 1 by employing 500 grams of methyl amyl ketone and 30 grams of t-butyl perbenzoate. The addition of initiator and the monomer mixture is completed in two hours and the reaction mixture is refluxed for one additional hour. Two grams of the initiator are then added and the reaction mixture refluxed for two hours. The molecular weight is determined by Gel Permeation Chromatography and found to be $\overline{M}_n = 3168$ and $\overline{M}_w/\overline{M}_n = 2.15$. The Tg of this polymer is calculated to be 20° C. Twenty-seven (27) parts of the above polymer solution and ten parts of Cymel 301 are dissolved in eight parts of butyl acetate and 2.8 parts of butyl acid phosphate (mixture of monobutyl and dibutyl phosphates) are added to this solution. The composition is drawn on a steel test paneland baked at 130° C. for 20 minutes. The coating has excellent hardness, adhesion and solvent (xylene and methyl ethyl ketone) resistance.

EXAMPLE 4

Twenty-seven (27) parts of the polymer described in Example 3, 13 parts of Cymel 301 and 5 parts of Acryloid OL-42 (Rohm and Haas Chem. Co.) are dissolved in 10 parts of butyl acetate. Three and seven tenths (3.7) parts of butyl acid phosphate (mixture of monobutyl and dibutyl phosphate) is added to the above solution and the resulting formulation drawn on a steel test panel. It is baked at 130° C. for ten minutes to obtain a glossy coating with excellent hardness, adhesion and solvent resistance.

EXAMPLE 5

Ethyl phosphorodichloridate (125 g) is dissolved in 150 ml butyl acetate, placed in a round bottom flask and cooled with an ice water mixture. Cold water (28 g) is added dropwise with stirring and simultaneous vacuum application with a water aspirator. The reaction mixture is stirred under vacuum for three days and then titrated with sodium hydroxide to obtain a monoethyl phosphate solution with acid equivalent weight of 112.

Eighty (80) parts of the polymer solution prepared in Example 1, 10 parts of bis-(hydroxypropyl) azelate (product of propylene oxide and azelaic acid) and 35 parts of ethoxymethoxymethyl benzoguanamine (Cymel 1123, American Cyanamid) are dissolved in 25 parts of butyl acetate and 10.1 parts of the above ethyl acid phosphate solution are added to this solution. The resulting formulation is applied to primed steel panels by spraying and is baked at 130° C. for 20 minutes to obtain hard, glossy coatings with excellent adhesion and solvent resistance.

EXAMPLE 6

A butyl acetate solution of mono-cyclohexylmethyl phosphate with an equivalent weight of 145 is prepared from cyclohexylmethyl phosphorodichloridate by following the procedure outlined in Example 5.

Twenty-five (25) parts of the polymer solution prepared in Example 3, 13 parts of hexamethoxymethyl melamine (Cymel 301, American Cyanamid), and 5 parts of caprolactone based hydroxyester PCP0300 (Union Carbide) are dissolved in ten (10) parts of butyl acetate. Four and two tenths (4.2) parts of the acid phosphate prepared above is added to the above solution and the resulting formulation is applied to primed steel test panels by spraying. The panels are baked at 130° C. for 20 minutes to obtain coatings with excellent hardness, adhesion, gloss and solvent resistance (xylene and methyl ethyl ketone).

EXAMPLE 7

The following mixture of monomers is used in a polymer synthesis:

|  | Wt. % |
| --- | --- |
| Butyl methacrylate | 25 |
| Glycidyl acrylate | 30 |
| Methyl methacrylate | 40 |
| Styrene | 5 |

The polymerization is carried out as outlined in Example 1 to obtain a 50% solution of the polymer.

Seventy (70) parts of the polymer solution, 15 parts of bis-(hydroxypropyl) azelate (reaction product of propylene oxide and azelaic acid) and 25 parts of hexamethoxymethyl melamine (Cymel 301) are dissolved in 10 parts of butyl acetate. Amyl acid phosphate (mixture of monoalkyl and dialkyl phosphate (13.3 parts)) is added to the above solution and the resulting formulation is applied to primed steel panels by spraying. The panels are baked at 130° C. for 20 minutes to obtain glossy (87°/20°) coatings with excellent adhesion, hardnes and solvent (xylene and methyl ethyl ketone) resistance.

EXAMPLE 8

A hydroxy acrylic copolymer is prepared from the following monomers:

|  | Wt. (grams) | Wt. % |
| --- | --- | --- |
| Butyl methacrylate | 1000 | 50 |
| Hydroxyethyl acrylate | 400 | 20 |
| Methyl methacrylate | 400 | 20 |
| Styrene | 200 | 10 |

One hundred grams t-butyl perbenzoate is added to the above monomer mixture and the resulting solution is added dropwise over a period of two hours to 1400 grams of refluxing methyl amyl ketone under nitrogen. The heating and stirring is continued for half an hour after the addition is complete and five (5) grams of t-butyl perbenzoate are added portionwise to the reaction mixture. The reaction mixture is refluxed for an additional ninety (90) minutes and then allowed to cool to room temperature. The molecular weight is determined by Gel Permeation Chromatography: $\overline{M}_n = 2540$, $\overline{M}_w/\overline{M}_n = 1.94$.

Forty (40) parts of the above polymer, 45 parts by weight of the glycidyl methacrylate polymer from Example 1 and 31 parts of hexamethoxymethyl malamine (Cymel 301) are dissolved in 20 parts of butyl acetate. 5.3 parts of butyl acid phosphate (mixture of monobutyl and dibutyl phosphates, eq. wt. 120) is added to the above solution and the resulting formulation is applied to primed steel test panels by spraying. The panels are baked at 130° C. for 20 minutes to obtain glossy coatings with excellent hardness, adhesion and solvent (xylene and methyl ethyl ketone) resistance.

EXAMPLE 9

Twenty-five (25) parts of polymer from Example 3, 25 parts of hydroxy polymer from Example 8 and 25 parts of hexabutoxy-methyl melamine (Cymel 1156) are dissolved in 15 parts of butyl acetate. Butyl acid phosphate (mixtures of monobutyl and dibutyl phosphates, eq. wt. 120) (3.4 parts) is added to the above solution and the resulting formulation is applied to primed steel panels by spraying. The panels are baked at 130° C. for 20 minutes to obtain glossy coatings with excellent hardness, adhesion and solvent resistance.

EXAMPLE 10

Thirty (30) parts of glycidyl methacrylate polymer from Example 3, 5 parts of bis-(hydroxypropyl) azelate and 15 parts of ethoxymethoxy methyl benzoguanamine (Cymel 1123, American Cyanamid) are dissolved in 10 parts of butyl acetate. 4.4 Parts of butyl acid phosphate (mixture of monobutyl and dibutyl phosphates, eq. wt. 120) is added to the above solution and the resulting formulation is applied to primed steel panels by spraying. The panels are baked at 130° C. for 20 minutes to obtain hard, glossy coatings with excellent adhesion and solvent (xylene and methyl ethyl ketone) resistance.

EXAMPLE 11

Twenty-five (25) parts of glycidyl methacrylate polymer from Example 1, 20 parts of hydroxy polymer from Example 8, 5 parts of bis-(hydroxypropyl) azelate and 17 parts of butoxymethyl glycoluril (Cymel 1170, American Cyanamid) is dissolved in 15 parts of butyl acetate. 3.3 Parts of butyl acid phosphate (mixture of monobutyl and dibutyl phosphates, eq. wt. 120) is added to the above solution and the resulting formulation is applied to primed steel panels by spraying. The panels are baked at 130° C. for 20 minutes to obtain hard, glossy coatings with excellent adhesion and solvent (xylene and methyl ethyl ketone) resistance.

EXAMPLE 12

Thirty (30) parts of glycidyl methacrylate polymer from Example 3, 7 parts of Acryloid OL42 (Rohm and Haas Chem. Co.), 25 parts of butoxymethyl urea resin (Beetle 80, American Cyanamid) are dissolved in 20 parts of butyl acetate. 4.4 Parts of butyl acid phosphate (mixture of monobutyl and dibutyl phosphate, eq. wt. 120) is added to the above solution and the resulting formulation is applied to primed steel panels by spraying. The panels are baked at 130° C. for 20 minutes to obtain a hard glossy coating.

EXAMPLE 13

The following mixture of monomers is employed in the synthesis of a polymer:

|  | Wt. % |
| --- | --- |
| Allyl glycidyl ether | 30 |
| Butyl methacrylate | 25 |
| Methyl methacrylate | 30 |
| Styrene | 15 |

The polymerization is carried out as outlined in Example 3 to obtain a 52% solution of the polymer in methyl amyl ketone.

Thirty-one (31) parts of the above polymer, 30 parts of hydroxy polymer from Example 8, and 17 parts of hexamethoxymethyl melamine (Cymel 301, American Cyanamid) are dissolved in 10 parts butyl acetate. 5.1 parts of butyl acid phosphate (mixture of monobutyl and dibutyl phosphates) is added to the above solution and the resulting formulation is applied to primed steel panels by spraying. The panels are baked at 130° C. for 20 minutes to obtain hard, glossy coatings with excellent adhesion and solvent (xylene and methyl ethyl ketone) resistance.

EXAMPLE 14

Monophenyl phosphate is prepared from phenyl phosphorodichloridate by following the procedure described in Example 5. The acid equivalent weight of this solution is found to be 144.

Forty (40) parts of the glycidyl methacrylate copolymer from Example 1, 30 parts of the hydroxy polymer from Example 8 and 25 parts of hexamethoxymethyl melamine (Cymel 301) are dissolved in 20 parts of butyl acetate. The phenyl phosphate solution (7.2 parts) is added to the above solution and the resulting formulation is spray applied to primed steel panels by spraying. The panels were baked at 130° C. for 20 minutes to obtain hard, glossy coatings with excellent adhesion and solvent resistance.

EXAMPLE 15

The following monomers are employed in synthesis of a polymer:

|  | Wt. % |
| --- | --- |
| Butyl methacrylate | 40 |
| Glycidyl methacrylate | 15 |
| Methyl methacrylate | 40 |
| Styrene | 5 |

The polymerization is carried out in methyl amyl ketone by employing 1.8% (by wt. of the monomers) of the initiator. The molecular weight from Gel Permeation Chromatography is found to be $\overline{M}_n=5750$, $\overline{M}_w/\overline{M}_n=2.4$. The solids content was found to be 54% by weight.

Sixty (60) parts of this polymer solution, 70 parts of polymer from Example 8 and 50 parts hexamethoxymethyl melamine (Cymel 301) were dissolved in 30 parts of butyl acetate. 4.1 parts of butyl acid phosphate (mixture of monobutyl and dibutyl phosphates, eq. wt. 120), is added to the above solution and the resulting formulation is spray applied to primed steel panels. The panels are baked at 130° C. for 20 minutes to obtain coatings with excellent hardness, adhesion and solvent (xylene and methyl ethyl ketone) resistance.

EXAMPLE 16

Ten parts of 2-ethyl-1, 3-hexane diol and 4 parts of hexamethoxymethyl malemine (Cymel 301) are added to the formulation described in Example 1. The resulting formulation is applied to primed steel panels by spraying in three coats with intermediate flash of one minute and a final flash of five minutes. The panels are baked at 120° C. for 20 minutes to obtain a clear coating with excellent hardness, adhesion, gloss (90°/20°) and solvent (xylene and methyl ethyl ketone) resistance.

EXAMPLE 17

The paint formulation described in Example 2 is repeated by employing 6 parts of aluminum flakes and 10.4 parts of butyl acid phosphate. The application and bake conditions are the same as in Example 2. The coating exhibits excellent physical properties.

EXAMPLE 18

Five (5) parts of polypropylene glycol (Pluracol (710, BASF Wyandotte Co.)) and 2 parts of hexamethoxy methyl melamine (Cymel 301) are added to the formulation described in Example 3. The resulting formulation is applied to primed steel test panels by spraying in a three coat application. The panels are baked at 130° C. for 15 minutes to obtain coatings with excellent gloss (91°/20°), adhesion, hardness and solvent resistance.

EXAMPLE 19

Three hundred fifty (350) grams of titanium dioxide is mixed with 350 parts of Acryloid OL-42 (Rohm and Haas Chemical Co.) and 25 parts of butyl acetate. The above mixture is taken up in a porcelain bottle containing porcelain beads and is put on a roller mill for 16 hours. Forty (40) parts of the above mill base is mixed with 28 parts of polymer from Example 1, 5 parts of hydroxy ester Desmophen KL5-2330 (Rohm and Haas Chem. Co.), 11 parts of hexamethoxymethyl melamine (Cymel 301) and 20 parts of butyl acetate. 3.8 parts of butyl acid phosphate (mixture of monobutyl and dibutyl phosphates, eq. wt. 120), is added to the above mixture and the resulting formulation is spray applied to primed steel panels. The panels are baked at 120° C. for 20 minutes to obtain coatings with excellent physical properties.

EXAMPLE 20

Five hundred (500) parts of titanium dioxide and 250 parts of Ferrite yellow are mixed with 500 parts of Acryloid OL-42 (Rohm and Haas Chem. Co.), 7.8 parts of dispersing agent BYKP104S (Mellinckrodt) and 200 parts of butyl acetate; the millbase is prepared as described in Example 19. Thirty-five (35) parts of this millbase are mixed with 50 parts of polymer from Example 3, 23 parts of hexamethoxymethyl melamine, 3 parts of 1,4-cyclohexamedimethanol and 22 parts of butyl acetate. 6.8 parts of butyl acid phosphate (eq. wt. 120), is added to the above mixture and the resulting formulation spray applied to primed steel panels. The panels are baked 115° C. for 20 minutes to obtain coatings with excellent physical properties.

EXAMPLE 21

Fifty (50) parts of blue pigment phthalo Blue are mixed with 500 parts of Acryloid OL-42 (Rohm and Haas Chem. Co.) and 44 parts of butyl acetate, the mill base is ground as described in Example 19.

Twenty-five parts of the above mill base are mixed with 41 parts of the polymer solution from Example 3, 6 parts of aluminum flakes (65% in naphtha), 15 parts of bis-(hydroxypropyl) azelate, 29 parts of hexamethoxymethyl melamine (Cymel 301) and 20 parts butyl acetate. 5.6 parts of butyl acid phosphate (eq. wt. 120) is added to the above mixture and the resulting formulation is spray applied to primed steel panels in four coats with one minute flash time between coats. After five minutes final flash the panels are baked at 130° C. for 20 minutes to a blue metallic coating with excellent hardness, adhesion and solvent resistance.

In view of this disclosure, many modifications of this invention will be apparent to those skilled in the art. It is intended that all such modifications which fall within the true scope of this invention be included within the terms of the appended claims.

What is claimed is:

1. A thermosetting coating composition adapted for low temperature bake applications which contains greater than about 60 percent by weight of nonvolatile solids, and which exclusive of pigments, solvents and other nonreactive components, consists essentially of:
   (A) a copolymer bearing pendant epoxy functionality, having a number average molecular weight ($\overline{M}_n$) of between about 1500 and about 10,000 and a glass transition temperature (Tg) of between about $-25°$ C. and about 70° C., said copolymer consisting of between about 10 and about 30 weight percent of monoethylenically unsaturated monomers bearing glycidyl functionality and between about 90 and about 70 weight percent of other monoethylenically unsaturated monomers;
   (B) at least one organophosphate ester having the formula:

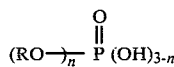

wherein n=1 to 2 and R is selected from the alkyl, cycloalkyl or aryl groups;
   (C) an amine-aldehyde crosslinking agent; and
   (D) up to 45 weight percent based on the total weight of (A), (B), (C), and (D) of a hydroxy functional additive having a number average molecular weight ($\overline{M}_n$) of between about 150 and about 6,000, said organophosphate ester being included in said composition in an amount sufficient to provide between about 0.67 and about 1.4 equivalents of acid functionality for each equivalent of pendant epoxy functionality on said copolymer and said amine-aldehyde crosslinking agent being included in said composition in an amount sufficient to provide at least about 0.67 equivalents of nitrogen crosslinking functionality for each equivalent of hydroxy functionality included in said composition either as a hydroxyl group on said hydroxy functional additive or as a result of esterification of said copolymer during cure of said coating composition.

2. A composition in accordance with claim 1, wherein said monoethylenically unsaturated monomers bearing glycidyl functionality are selected from glycidyl esters and glycidyl ethers.

3. A composition in accordance with claim 2, wherein said monoethylenically unsaturated monomers bearing glycidyl functionality are selected from glycidyl esters of monoethylenically unsaturated carboxylic acids.

4. A composition in accordance with claim 1, wherein said other monoethylenically unsaturated monomers are selected from the group consisting of acrylates, other vinyl monomers, and mixtures of said acrylates and other vinyl monomers.

5. A composition in accordance with claim 4, wherein said acrylate monomers comprise at least about 50 weight percent of the total monomers in said copolymer and are selected from esters of $C_1$–$C_{12}$ monohydric alcohols and acrylic or methacrylic acids.

6. A composition in accordance with claim 1, wherein said organophosphate ester comprises an alkyl monoester.

7. A composition in accordance with claim 6, wherein the alkyl group of said organophosphate monoester is a primary straight chain radical containing 2 to 6 carbon atoms.

8. A composition in accordance with claim 1, wherein said organophosphate ester is alkyl diester.

9. A composition in accordance with claim 8, wherein at least one alkyl group of said organophosphate diester is a primary straight chain radical containing 2 to 6 carbon atoms.

10. A composition in accordance with claim 1, wherein said organophosphate ester is a mixture of alkyl mono- and diesters.

11. A composition in accordance with claim 10, wherein at least one alkyl group of said organophosphate ester is a primary straight chain radical containing 2 to 6 carbon atoms.

12. A composition in accordance with claim 1, wherein said amine-aldehyde crosslinking agent is selected from the group consisting of condensation products of formaldehyde with melamine, substituted melamine, urea, benzoguanamine and substituted benzoguanamine, and mixtures of said condensation products, and is included in an amount sufficient to provide between about 0.75 and about 3.75 equivalents of nitrogen crosslinking functionality for each equivalent of hydroxy functionality included in said composition, either as a hydroxyl group on said hydroxy functional additive, or as a result of esterification of said pendant epoxy functionality of said copolymer during cure of said coating composition.

13. A composition in accordance with claim 1, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 2.5 to about 30 weight percent of said copolymer, and (vi) mixtures of (i)–(v).

14. A composition in accordance with claim 1, wherein said organophosphate ester is included in said composition in an amount sufficient to provide between about 0.8 and about 1 equivalents of acid functionality for each equivalent of pendant epoxy functionality on said copolymer.

* * * * *